Patented Mar. 8, 1927.

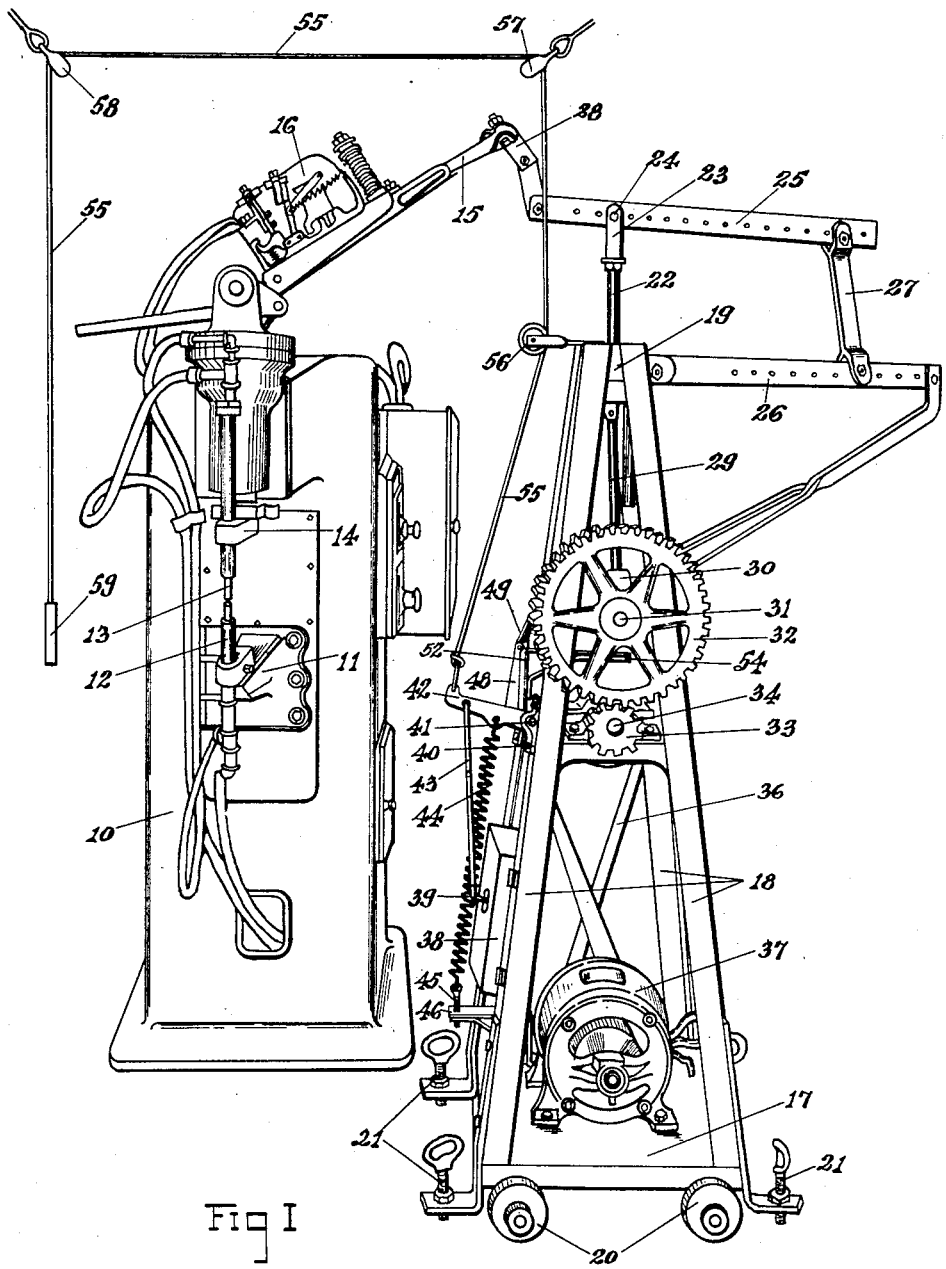

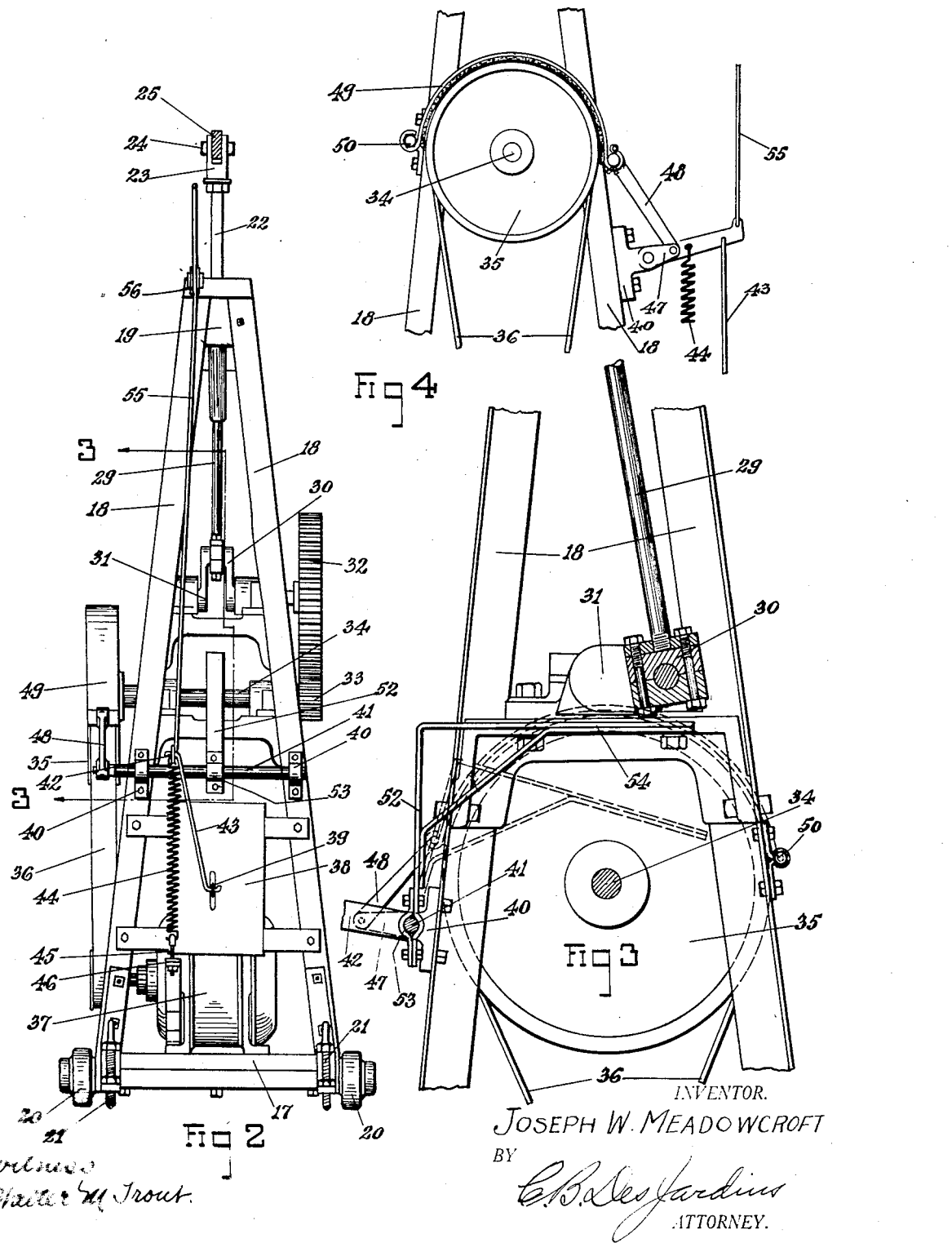

1,620,274

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMATIC ELECTRIC WELDING MACHINE.

Application filed September 17, 1921, Serial No. 501,274. Renewed January 21, 1927.

My invention relates to improvements in automatic electric welding machines and has to do, more particularly, with control mechanism for such machines.

My invention is illustrated, in this application, in connection with the automatic electric welding machine described and claimed in the pending application of Joseph Ledwinka, Serial No. 430,320, filed December 13th, 1920, and assigned to the same assignee as present application.

One of the objects of my invention is to provide means, under the control of the operator, for stopping the welding machine so as to leave the movable electrode in its raised position ready for the insertion of the parts to be welded between the electrodes of the machine. Another object of my invention is to provide means, under the control of the operator, which cuts off the current to the driving motor, applies a brake and stops the machine with the movable electrode in its upper position.

Further objects, and objects relating to details and economies of construction and operation, will definitely appear from the detailed description to follow. My invention is clearly defined and pointed out in the appended claims. A structure constituting one preferred embodiment of my invention is illustrated in the accompanying drawings, forming a part of this specification, in which:—

Fig. 1 is a view in perspective of an automatic electric welding machine embodying my invention.

Fig. 2 is a view in side elevation of a part of the machine.

Fig. 3 is an enlarged, sectional view taken on the line 3—3 of Fig. 2, and

Fig. 4 is a fragmentary view in side elevation showing the brake and brake-operating mechanism.

In the drawings, the same reference numerals refer to the same parts throughout the several views, and the sectional view is taken looking in the direction of the arrows at the ends of the section line.

In general, I accomplish the objects of my invention by providing, in combination with a spot-welding machine including a fixed and a reciprocating electrode and suitable power mechanism for reciprocating said electrode automatically, control mechanism actuated by the operator which automatically disconnects the power mechanism from the source of power, applies a brake to certain of the moving parts to absorb their momentum and bring them to a stop at once, and interposes a stop in the path of certain of the moving parts compelling them to come to rest in a position which will leave the reciprocating electrode at such a point in its stroke that the work may be removed from or inserted between the cooperating electrodes of the machine. I find it very desirable to arrange this control mechanism so that the power is thrown on, the brake released and the stop withdrawn by the actuation of a control member by the operator against the tension of a spring, which cuts off the power, applies the brake and advances the stop member, automatically, when the control member is released. I have shown one embodiment of my invention in connection with an automatic electric welding machine in which the usual actuating lever of a spot-welding machine is automatically and repeatedly reciprocated through a linkage connected to said lever and actuated by a pitman which reciprocates in a suitable standard. The pitman is reciprocated by a crank shaft to which it is connected, said crank shaft being driven from a suitable motor. In this case, I carry out my invention by providing a suitably journaled rock shaft which is connected to the handle of the switch lever controlling the circuit of the driving motor, a brake which coacts with a driving pulley connected to the crank shaft, and a stop arm which is adapted to be interposed in the path of the crank. This rock shaft may be oscillated in one direction, to throw on the motor, release the brake and withdraw the stop, by means under the control of the operator and, in the other direction, to cut off the motor, apply the brake and advance the stop, by suitable spring means.

The structure illustrated in the accompanying drawings, which constitutes one embodiment of my invention, shows the invention in connection with the machine described and claimed in the pending application of Joseph Ledwinka, above-mentioned. That machine comprises the frame, 10, of the spot-welder, having the lower electrode arm, 11, carrying the lower, fixed electrode, 12. The machine has a reciprocating plunger, 14, carrying the upper, movable electrode, 13, and the plunger is reciprocated by oscillating the actuating lever, 15, on its fulcrum. The electrodes, 12 and 13, are connected with opposite sides of the secondary of a transformer, which furnishes the welding current, and the welding circuit is controlled by the automatic switch, 16, mounted on the actuating lever, 15. A standard is positioned adjacent the frame, 10, and comprises the angle bars, 18, secured, at their lower ends, to the base, 17, and, at their upper ends, to the block, 19. The base may be provided with the rollers, 20, and the adjustable feet, 21. The pitman, 22, is mounted in the block, 19, so as to be vertically reciprocable therein and the upper forked end, 23, of the pitman is connected, at 24, to a bar, 25, which is fulcrumed on the upper end of a link, 27, the lower end of which is connected pivotally to the bar, 26, extending laterally from the block, 19, and supported by the standard. One end of bar, 25, is connected by the link, 28, to the handle of the actuating lever, 15. The lower end of the connecting pitman, 22, is connected by the connecting rod, 29, to the crank, 30, of the crank shaft, 31, the latter being journaled in suitable bearings carried by the standard. The crank shaft is driven by the gear, 32, fixed upon it and meshing with the pinion, 33, on the counter-shaft, 34, said counter-shaft being journaled in suitable bearings on the standard. The counter-shaft carries the driving pulley, 35, connected by belt, 36, with the driving motor, 37, on the base, 17. The motor circuit is controlled by the switch, 38, having the operating handle, 39.

The machine which I have just described is the same as that described and claimed in the above-mentioned, pending application of Joseph Ledwinka, Serial No. 430,320, and, in this case, I have embodied my invention in certain attachments or appliances built into this machine. In the construction illustrated, the rock-shaft, 41, is journaled in brackets, 40, mounted on the angle bars, 18, of the standard. The arm, 42, is fixed on said rock-shaft and projects laterally therefrom and the outer end of said arm is connected by link, 43, to the switch-operating handle, 39. One end of a coil spring, 44, is fastened to the arm, 42, while the other end of said spring is secured to the pin, 45, adjustably mounted in the fixed bracket, 46. An arm, 47, is rigidly fastened on the rock-shaft, 41, about in line with the pulley, 35, and the free end of said arm is connected by link, 48, with a brake-band, 49, pivoted on the standard at 50 and cooperating with the rim of the driving pulley, 35. The stop member, 52, is rigidly clamped to the rock-shaft, 41, at 53, and this stop member has an arm, 54, which projects transversely of the crank-shaft, 31, and just below it so that it will be in the path of the crank, 30, as the shaft revolves. Any suitable means may be provided for rotating the rock-shaft, 41. In this case, I accomplish it by means of a cable, 55, fastened to the outer end of the arm, 42, and carried over pulleys, 56, 57 and 58, so that the pull handle, 59, at the free end of the cable, hangs at a point convenient for the operator to grasp.

The foregoing description of the parts makes the operation of the mechanism very apparent. The spring, 44, acting on the arm, 42, holds the rock-shaft, 41, in a position such that the switch-operating handle, 39, is thrown to a position in which the current is cut off from the driving motor, 37. In this same position of the rock-shaft, 41, the brake band, 49, is held against the rim of the driving pulley, 35, and the stop, 52, is so positioned that the arm, 54, extends beneath the crank shaft, 31, as shown in full lines in Fig. 3, so that the crank, 30, strikes against the arm as the shaft rotates. Because of this, the machine will come to rest with the crank in the upper portion of its path and, consequently, with the upper electrode raised and the welding circuit open. When the operator desires to start the machine, he pulls on the cable, 55, and rocks the rock-shaft, 41, against the tension of spring, 44. This causes an upward movement of link, 43, which throws the switch-operating handle, 39, to a position in which the motor circuit is closed so that the driving motor, 37, is started. The same movement of the rock-shaft throws the brake band, 49, away from the rim of the pulley, 35, and swings the stop arm, 54, out of the path of the crank, 30, so that the crank-shaft is free to revolve. When the welding operation is completed, the operator releases the cable, 55, and the spring, 44, restores the rock-shaft to normal position in which the motor circuit is open, the brake-band, 49, applied to the pulley and the stop arm, 54, interposed in the path of the crank, 30. The momentum of the parts causes the crank-shaft, 31, to make two or three revolutions after the stop-arm is interposed in the path of crank, 30. At each such revolution of the shaft, the crank will strike the stop-arm, 54, and swing it to one side. The spring, 44, permits this and returns the stop-arm to normal position after the crank, 30, has passed. The connection between the link, 43, and the switch-operating handle, 39, is such that lost motion is permitted between these parts so that the movement of rock-shaft, 41, caused by the crank, 30, striking arm, 54, and swinging it to one side, will not be sufficient to throw the switch, 38, and close the motor circuit.

In automatic electric welding machines with which I am familiar, the driving mechanism is so controlled that the operator allows the machine to run while removing the work and inserting new work between the electrodes of the machine. For instance, in the machine described in the above-mentioned Ledwinka application, the operator throws the motor switch and starts the machine running when he begins to use it, and allows the machine to run while he is changing the work. This results in a considerable loss of electric current due to the fact that the motor, 37, is running for considerable periods when it is not necessary. It will be seen that, in accordance with my invention, the motor, 37, is not running except when the operator pulls on cable, 55, and rocks the shaft, 41, against the tension of spring, 44. The cable, 55, and the pull handle, 59, are so arranged that the operator can pull the cable conveniently when the work is between the electrodes of the machine, and when the cable is released the machine stops. This results in a saving as the motor, 37, is cut off when it is not needed. It is essential, however, that the machine be stopped with the upper electrode raised and the electrodes out of contact with each other, because, if the machine were stopped with the electrodes in contact, the welding circuit might be closed and burn out the transformer. Furthermore, this would prevent the insertion of new work between the electrodes. It will be noted that I have provided means to prevent the machine stopping with the electrodes in contact. In this embodiment, this is accomplished by the brake band, 49, and the stop-arm, 54, which swings into the path of the crank, 30, and compels it to come to a stop in the upper portion of its path.

I am aware that this particular embodiment may be changed considerably without departing from the spirit of my invention, and, therefore, I desire to claim my invention broadly, as indicated by the appended claims.

Having thus described my invention, what I claim as new and useful and desire to secure by Letters Patent is:—

1. A machine of the character described comprising a pair of electrodes connected in an electric circuit, motor means for automatically and continuously reciprocating one of said electrodes and means for automatically arresting the moving parts of said motor means only at such time when said electrodes are in separated position.

2. A machine of the character described comprising a pair of cooperating electrodes connected in a welding circuit, a motor, means driven by said motor for automatically and continuously reciprocating one of said electrodes, control means for said motor, brake mechanism, and means cooperating therewith for arresting the moving parts of the machine in a position in which said electrodes are separated.

3. A machine of the character described comprising a pair of cooperating electrodes connected in a welding circuit, a motor, means driven by said motor for automatically and continuously reciprocating one of said electrodes, control means for said motor, means for arresting the moving parts of the machine in a position in which said electrodes are separated, and a common member for actuating said last-mentioned means and said motor-control means.

4. A machine of the character described comprising a pair of electrodes connected in a welding circuit, a motor, means driven by said motor for automatically and continuously reciprocating one of said electrodes, control means for said motor, brake mechanism, means cooperating therewith for arresting the moving parts of the machine in a position in which said electrodes are separated, and a common member for actuating said last-mentioned means, said brake-mechanism and said motor-control means.

5. A machine of the character described comprising a pair of electrodes connected in a welding circuit, a motor, means driven by said motor for automatically reciprocating one of said electrodes, control means for said motor, means for arresting the moving parts of the machine in a position in which said electrodes are separated, a common member for actuating said last-mentioned means and said motor control means, a spring for moving said member to stopping position, and means for moving said member to running position.

6. A machine of the character described comprising a pair of electrodes connected in a welding circuit, a motor, means driven by said motor for automatically reciprocating one of said electrodes, and a stop member adapted to be interposed in the path of a moving part of the machine to bring the machine to rest with said electrodes separated.

7. A machine of the character described comprising a pair of electrodes connected in a welding circuit, a motor, means driven by said motor for automatically reciprocating one of said electrodes, a switch controlling the motor circuit, a stop member adapted to be interposed in the path of a moving part of the machine to bring the machine to rest with said electrodes separated, and a common member for actuating said switch and stop member.

8. A machine of the character described comprising a pair of electrodes connected in a welding circuit, a motor, means driven by said motor for automatically reciprocating one of said electrodes, a switch controlling the motor circuit, a brake cooperating with a moving part of the machine, to stop-member adapted to be interposed in the path of a moving part of the machine to bring the machine to rest with said electrodes separated, and a common member for actuating the switch, brake and stop-member.

9. A machine of the character described comprising a pair of electrodes connected in a welding circuit, a motor, means driven by said motor for automatically reciprocating one of said electrodes, a switch controlling the motor circuit, a stop-member adapted to be interposed in the path of a moving part of the machine, an actuating member to which said switch and stop-member are connected, spring means for moving said actuating member to stopping position, and means for moving said actuating member to running position.

10. In a machine of the character described, the combination with a pair of electrodes connected in a welding circuit, a motor, and a crank shaft driven by said motor and having a crank connected to reciprocate one of said electrodes, of a stop-member, and means for interposing said stop-member in the path of said crank to bring the machine to rest with said electrodes separated.

11. In a machine of the character described, the combination with a pair of electrodes connected in a welding circuit, a motor, a switch controlling the motor circuit, and a crank shaft driven by said motor and having a crank connected to reciprocate one of said electrodes, of a stop-member and a common means for actuating said switch and interposing said stop-member in the path of said crank to bring the machine to rest with said electrodes separated.

12. In a machine of the character described, the combination with a pair of electrodes connected in a welding circuit, a motor, a switch controlling the motor circuit, a crank shaft having a crank connected to reciprocate one of said electrodes, and driving connections between said motor and said crank shaft including a pulley, of a brake cooperating with said pulley, a stop-member, and a common means for actuating said switch, brake and stop-member.

13. In a machine of the character described, the combination with a pair of electrodes connected in a welding circuit, a motor, and a crank shaft driven by said motor and having a crank connected to reciprocate one of said electrodes, of a rock shaft, a stop-member carried thereby, and means for actuating said rock shaft to interpose said stop-member in the path of said crank.

14. In a machine of the character described, the combination with a pair of electrodes connected in a welding circuit, a motor, a switch controlling the motor circuit, and a crank shaft driven by said motor and having a crank connected to reciprocate one of said electrodes, of a rock shaft, connections between said switch and the rock shaft, a stop-member carried by said rock shaft, and means for actuating said rock shaft to open the switch and interpose the stop-member in the path of said crank.

15. In a machine of the character described, the combination with a pair of electrodes connected in a welding circuit, a motor, a switch controlling the motor circuit, and a crank shaft driven by said motor and having a crank connected to reciprocate one of said electrodes, of a rock-shaft, connections between said rock shaft and the switch, a stop-member carried by said rock-shaft, spring means for actuating the rock shaft in one direction to open the switch and interpose the stop-member in the path of said crank, and means for actuating said rock shaft in the other direction to close the switch and remove the stop-member from the path of said crank.

16. In a machine of the character described, the combination with a pair of electrodes connected in a welding circuit, a motor, a switch controlling the motor circuit, and a crank shaft driven by said motor and having a crank connected to reciprocate one of said electrodes, of a rock shaft, an arm projecting therefrom, a link connecting said arm and the switch, a stop member rigidly secured to said rock shaft and having an arm interposed, in one position of the rock shaft, in the path of said crank, and means for actuating said rock shaft.

17. In a machine of the character described, the combination with a pair of electrodes connected in a welding circuit, a motor, a switch controlling the motor circuit, and a crank shaft driven by said motor and having a crank connected to reciprocate one of said electrodes, of a rock shaft, an arm projecting therefrom, a link connecting said arm and the switch, a stop-member rigidly secured to said rock shaft and having an arm interposed, in one position of the rock shaft, in the path of said crank, a spring connected to the rock shaft arm to move it in one direction, and a cable also connected to said arm.

18. In a machine of the character described, the combination with a pair of electrodes connected in a welding circuit, a motor, a switch controlling the motor circuit, a crank shaft having a crank connected to reciprocate one of said electrodes, and driving connections between said motor and crank shaft including a pulley, of a rock shaft, connections between said switch and the rock shaft, a brake cooperating with said pulley, connections between said brake and the rock shaft, a stop-member carried by said rock shaft, and means for actuating the rock shaft to open the switch, apply the brake and interpose the stop-member in the path of said crank.

19. In a machine of the character described, the combination with a pair of electrodes connected in a welding circuit, a motor, a switch controlling the motor circuit, a crank shaft having a crank connected to reciprocate one of said electrodes, and driving connections between said motor and crankshaft including a pulley, of a rock shaft, connections between said rock shaft and said switch, a brake coacting with said pulley, connections between said brake and the rock shaft, a stop-member carried by said rock shaft, spring means for actuating said rock shaft in one direction to open the switch, apply the brake and interpose the stop-member in the path of said crank, and means for actuating said rock shaft in the other direction to close the switch, release the brake and remove the stop-member from the path of said crank.

20. In a machine of the character described, the combination with a pair of electrodes connected in a welding circuit, a motor, a switch controlling the motor circuit, a crankshaft having a crank connected to reciprocate one of said electrodes, and driving connections between the motor and said crank shaft including a pulley, of a rock shaft, an arm projecting therefrom, a link connecting said arm and the switch, a brake coacting with said pulley, a brake-operating arm projecting from said rockshaft, a stop-member rigidly secured to said rock shaft and having an arm interposed, in one position of the rock shaft, in the path of said crank, and means for actuating said rock shaft.

21. A machine of the character described comprising a pair of cooperating electrodes connected in the welding circuit, a driving motor for operating said electrodes, means for controlling the power supply to said driving motor and means insuring the open position of said electrodes when the power supply to the driving motor is cut off and the motor is at rest.

22. A machine of the character described comprising a welding mechanism including a primary circuit therefor, switch means in said primary circuit, driving means for operating said welding mechanism, stop means for arresting the movement of said driving means, and means interposed between said switch and stop means for insuring the maintenance of said primary circuit switch in open position when said driving means is in its arrested position.

In testimony whereof, I affix my signature.

JOSEPH W. MEADOWCROFT.